(12) United States Patent
Nassaur

(10) Patent No.: US 10,846,070 B2
(45) Date of Patent: Nov. 24, 2020

(54) FACILITATING CLOUD NATIVE EDGE COMPUTING VIA BEHAVIORAL INTELLIGENCE

(71) Applicant: AT&T Intellectual Property I, L.P., Atlanta, GA (US)

(72) Inventor: Douglas Nassaur, Gainesville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/028,093

(22) Filed: Jul. 5, 2018

(65) Prior Publication Data

US 2020/0012483 A1 Jan. 9, 2020

(51) Int. Cl.
| | |
|---|---|
| G06F 8/60 | (2018.01) |
| H04L 12/911 | (2013.01) |
| G06F 9/50 | (2006.01) |
| H04L 29/08 | (2006.01) |

(52) U.S. Cl.
CPC .............. *G06F 8/60* (2013.01); *G06F 9/5072* (2013.01); *H04L 47/781* (2013.01); *H04L 67/34* (2013.01)

(58) Field of Classification Search
CPC ..................................... G06F 8/61; G06F 8/65
USPC ................................................. 717/168–178
See application file for complete search history.

(56) References Cited

U.S. PATENT DOCUMENTS

| | | | |
|---|---|---|---|
| 5,475,819 A | 12/1995 | Miller et al. | |
| 6,058,426 A | 5/2000 | Godwin et al. | |
| 6,880,002 B2 | 4/2005 | Hirschfeld et al. | |
| 6,990,666 B2 | 1/2006 | Hirschfeld et al. | |
| 7,437,706 B2 | 10/2008 | Woodgeard | |
| 7,802,238 B2 | 9/2010 | Clinton | |
| 8,014,308 B2 | 9/2011 | Gates et al. | |
| 8,015,547 B2 | 9/2011 | Harvey et al. | |

(Continued)

FOREIGN PATENT DOCUMENTS

| | | |
|---|---|---|
| CN | 102655532 A | 9/2012 |
| JP | 2012208747 A | 10/2012 |

(Continued)

OTHER PUBLICATIONS

Zeng, Qinpeng Zeng, "A SaaS Development Platform Based on Cloud Computing," Telkomnika, vol. 11, No. 3, Mar. 2013, pp. 1646-1651. 6 pages.

(Continued)

*Primary Examiner* — Wei Y Zhen
*Assistant Examiner* — Binh Luu
(74) *Attorney, Agent, or Firm* — Amin, Turocy & Watson, LLP

(57) ABSTRACT

Behavioral intelligence can be used with cloud native computing to enhance software deployment for various infrastructures by analyzing and deploying software functions according to the various infrastructures. Because different providers can have their own systems and controls for managing their infrastructures, it is costly to deploy software functions that are coupled together. However, if the software functions are disaggregated and translated according to the systems and controls relative to the various infrastructures, then the software functions can be failed and scaled independently of one another, thereby generating efficiencies.

20 Claims, 12 Drawing Sheets

(56) References Cited

U.S. PATENT DOCUMENTS

| | | | |
|---|---|---|---|
| 8,131,844 | B2 | 3/2012 | Moore et al. |
| 8,250,213 | B2 | 8/2012 | Glover et al. |
| 8,417,938 | B1 | 4/2013 | Considine |
| 8,438,286 | B2 | 5/2013 | Glover et al. |
| 8,495,611 | B2 | 7/2013 | Mccarthy et al. |
| 8,850,026 | B2 | 9/2014 | Glover et al. |
| 8,997,078 | B2 | 3/2015 | Spivak |
| 9,063,746 | B2 | 6/2015 | Yousouf et al. |
| 9,158,734 | B1 | 10/2015 | Prabhakara |
| 9,176,773 | B2 | 11/2015 | Fries et al. |
| 9,503,549 | B2 | 11/2016 | Radhakrishnan et al. |
| 9,753,784 | B2 | 9/2017 | Nassaur et al. |
| 9,891,910 | B1* | 2/2018 | Cumming ............ H04L 67/2804 |
| 9,934,027 | B2 | 4/2018 | Shine et al. |
| 2003/0051021 | A1 | 3/2003 | Hirschfeld et al. |
| 2005/0138204 | A1 | 6/2005 | Iyer et al. |
| 2005/0138625 | A1 | 6/2005 | Carroll et al. |
| 2005/0182582 | A1* | 8/2005 | Chen ................... G06F 11/3433 |
| | | | 702/108 |
| 2006/0085785 | A1 | 4/2006 | Garrett |
| 2008/0034365 | A1 | 2/2008 | Dahlstedt |
| 2008/0080396 | A1 | 4/2008 | Meijer et al. |
| 2008/0080552 | A1 | 4/2008 | Gates et al. |
| 2008/0082546 | A1 | 4/2008 | Meijer et al. |
| 2008/0209451 | A1 | 8/2008 | Michels et al. |
| 2009/0111431 | A1* | 4/2009 | Shaffer ............... H04M 1/7253 |
| | | | 455/412.2 |
| 2009/0183168 | A1 | 7/2009 | Uchida |
| 2010/0058328 | A1 | 3/2010 | DeHaan |
| 2010/0115097 | A1* | 5/2010 | Gnanasambandam ...................... |
| | | | G06F 9/5027 |
| | | | 709/226 |
| 2011/0047540 | A1 | 2/2011 | Williams et al. |
| 2011/0087783 | A1 | 4/2011 | Annapureddy et al. |
| 2011/0126168 | A1 | 5/2011 | Ilyayev |
| 2011/0126197 | A1 | 5/2011 | Larsen et al. |
| 2011/0296023 | A1 | 12/2011 | Eteminan et al. |
| 2011/0302573 | A1* | 12/2011 | Bubolz ................... G06F 8/61 |
| | | | 717/173 |
| 2012/0151278 | A1* | 6/2012 | Tsantilis ............... G06F 11/079 |
| | | | 714/48 |
| 2012/0180029 | A1 | 7/2012 | Hill et al. |
| 2012/0185913 | A1 | 7/2012 | Martinez et al. |
| 2012/0278454 | A1 | 11/2012 | Stewart et al. |
| 2012/0331441 | A1 | 12/2012 | Adamson |
| 2013/0036328 | A1* | 2/2013 | Mutisya ............. G06F 11/3688 |
| | | | 714/15 |
| 2013/0073614 | A1 | 3/2013 | Shine et al. |
| 2013/0159892 | A1 | 6/2013 | Suraj et al. |
| 2013/0185699 | A1 | 7/2013 | Oguma et al. |
| 2013/0191823 | A1 | 7/2013 | Davidson et al. |
| 2013/0234853 | A1 | 9/2013 | Kazerouni |
| 2013/0239089 | A1 | 9/2013 | Eksten et al. |
| 2013/0246626 | A1 | 9/2013 | Glover et al. |
| 2013/0254755 | A1 | 9/2013 | Yousouf |
| 2013/0275623 | A1 | 10/2013 | Stoilov et al. |
| 2013/0346945 | A1 | 12/2013 | Yousouf |
| 2014/0109072 | A1* | 4/2014 | Lang ..................... G06F 8/52 |
| | | | 717/168 |
| 2014/0280961 | A1 | 9/2014 | Martinez et al. |
| 2014/0344461 | A1 | 11/2014 | Carter et al. |
| 2015/0193296 | A1* | 7/2015 | Chen .................... G06F 11/079 |
| | | | 714/15 |
| 2015/0261575 | A1* | 9/2015 | Blanding ............. G06F 9/5011 |
| | | | 718/104 |
| 2015/0378706 | A1* | 12/2015 | Roese .................... G06F 8/61 |
| | | | 717/176 |
| 2016/0041866 | A1* | 2/2016 | Oleynikov ......... G06F 16/9535 |
| | | | 714/15 |
| 2016/0119202 | A1 | 4/2016 | Iyer et al. |
| 2016/0124742 | A1 | 5/2016 | Rangasamy et al. |
| 2016/0127254 | A1 | 5/2016 | Kumar et al. |
| 2017/0295062 | A1* | 10/2017 | Tang ................... H04L 41/0806 |
| 2017/0303150 | A1 | 10/2017 | Frydman et al. |
| 2018/0024867 | A1* | 1/2018 | Gilsdorf .................. H04L 43/08 |
| | | | 709/226 |
| 2018/0157481 | A1* | 6/2018 | Zessin .................... H04L 9/3239 |
| 2018/0189050 | A1* | 7/2018 | Salapura .................. G06F 8/65 |
| 2018/0260201 | A1* | 9/2018 | Liu ........................... G06F 8/61 |
| 2019/0034227 | A1* | 1/2019 | Suman ................. G06F 9/5038 |

FOREIGN PATENT DOCUMENTS

| | | |
|---|---|---|
| WO | 2013072925 A2 | 5/2013 |
| WO | 2013133922 A1 | 9/2013 |

OTHER PUBLICATIONS

"Amazon Elastic Computing Cloud," http://aws.amazon.com/ec2 Last Accessed Jun. 26, 2018, 13 pages.

Armbrust, Michael, et al., "Above the Clouds: A Berkeley View of Cloud Computing," Technical Report UCB/EECS-2009-3 28, EECS Department, University of California, Berkeley, February Technical Report No. UCB/EECE-2009-28, http:/ /www.eecs.berkeley.edu/Pubs/TechRpts/2009/EECS-2009-28.html, Feb. 10, 2009, 25 pages.

Clark Christopher, et al., "Live Migration of Virtual Machines," in Proceedings of NSDA, http:/ /www.cl.cam.ac.uk/research/srg/netos/pa pers/2005-m igration-nsdi-pre.pdf, May 2005,14 pages.

Duffield, N.G., et al., "Resource management with hoses: Point-to-cloud services for Virtual Private Networks," IEEE ACM Transactions on Networking, 2002, 16 pages.

Cohen, Reuven, "Elasticvapor Blog: Virtual Private Cloud," www.elasticvapor.com/2008/05/virtual-privatecloud-vpc.htm, May 8, 2008, 2 pages.

Google, "Google App Engine," http://code.google.com/appengine/, Last Accessed Jun. 26, 2018, 10 pages.

Nelson, Michael, et al., "Fast Transparent Migration for Virtual Machines," In ATEC '05 Proceedings of the annual conference on USEN IX Annual Technical Conference, 2005, 4 pages.

Ramakrishnan, K.K, et al., "Live Data Center Migration Across WANs: A Robust Cooperative Context Aware Approach," in INM '07: Proceedings of the SIGCOMM workshop on Internet network management, Aug. 27-31, 2007, 6 pages.

Ruth, Paul, et al., "Autonomic Live Adaptation of Virtual Computational Environments in a Multi-Domain Infrastructure," in ICAC '06: Proceedings of the 2006 IEEE International Conference of Autonomic Computing,2006, 10 pages.

Sundararaj, Ananth I., et al., "Towards Virtual Networks for Virtual Machine Grid Computing," in VM '04: Proceedings of the 3rd conference on Virtual Machine Research and Technology Symposium, 2004, 14 pages.

U.S. Office Action dated Nov. 17, 2011 in U.S. Appl. No. 12/619,301. 37 pages.

U.S. Notice of Allowance dated Apr. 26, 2012 in U.S. Appl. No. 12/619,301. 30 pages.

U.S. Notice of Allowance dated Jun. 25, 2012 in U.S. Appl. No. 12/619,301. 9 pages.

U.S. Notice of Allowance dated Oct. 15, 2012 in U.S. Appl. No. 13/567,405. 28 pages.

Vecchiola, Christian, et al., "High-Performance Cloud Computing: A View of Scientific Applications," IEEE 2009, 13 Pages (4-16).

Zhao, Liang, et al., "Evaluating Cloud Platform Architecture with the CARE framework," Asia Pacific Software Engineering Conference, 2010 IEEE, 10 Pages (60-69).

Fan, Pei, et al, "A topology-aware method for scientific application deployment on cloud" Int. J. Web and Grid Services, vol. 10, No. 4, 2014. 33 pages.

Calheiros, Rodrigo, N., et al, "CloudSim: A Toolkit for the Modeling and Simulation of Cloud Resource Management and Application Provisioning Techniques," Software: Practice and Experience, 2011; 41: 23-50. 28 pages.

Brady, Kevin F., "Cloud Computing—Is It Safe for IP," Portfolio Media, Inc., http://www.law360.com/print_article/113709, Aug. 27, 2009, 8 pages.

* cited by examiner

FACILITATING CLOUD NATIVE EDGE COMPUTING VIA BEHAVIORAL INTELLIGENCE

TECHNICAL FIELD

This disclosure relates generally to facilitating cloud native edge computing. More specifically, this disclosure relates to facilitating cloud native edge computing via behavioral intelligence.

BACKGROUND

Edge computing is a method of optimizing cloud computing systems by taking the control of computing applications, data, and services away from some central nodes (e.g., the core) to another logical extreme (e.g., the edge) of the Internet, which makes contact with the physical world. In this architecture, data comes in from the physical world via various sensors, and actions are taken to change a physical state via various forms of output and actuators. By performing analytics and knowledge generation at the edge, communications bandwidth between systems under control and the central data center is reduced. Edge computing takes advantage of proximity to the physical items of interest also exploiting relationships those items may have to each other.

The above-described background relating to a cloud edge computing is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
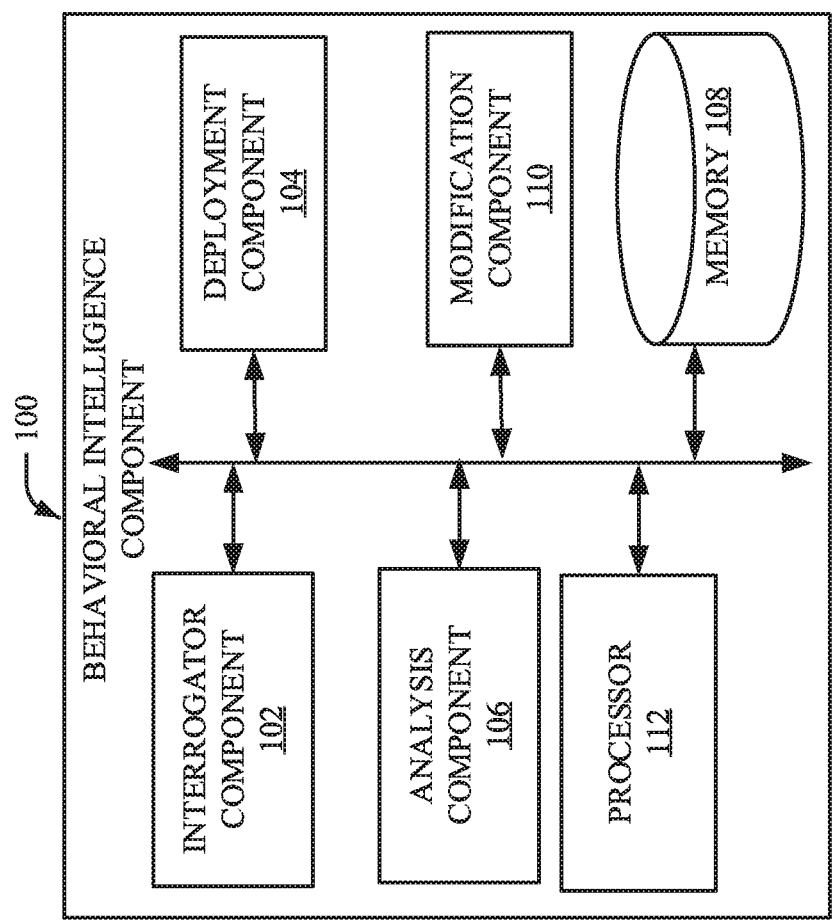
FIG. 1 illustrates an example behavioral intelligence component of a wireless network according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate cloud native-edge computing via behavioral intelligence.

For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate cloud native edge computing via behavioral intelligence. Facilitating cloud native edge computing via behavioral intelligence can be implemented in connection with any type of device with a connection to the communications network such as: a mobile handset, a computer, a handheld device, or the like.

The cloud native edge computing landscape can incorporate many providers, each using their own technology and adopting new innovation at their own pace. Traditional and software-defined networking can combine capabilities and resources into an in-region, out-of-region, and cross-carrier edge network. Each provider can adopt their own systems and controls for managing their infrastructure. Although these controls and systems can be focused on physical infrastructures, virtual infrastructures, and foundational connectivity, they may not understand software functionality. Applying span of control and separation of concerns to these systems can mean dividing key functions. Thus, this disclosure can establish a similar model for the software-defined edge-computing infrastructure that can support software-defined networking (SDN), internet-of-things (IoT), augmented reality (AR), virtual reality (VR), video and other key content and capability driven services. It should also be noted that software-defined networks can comprise software-defined networking devices configured to communicate between the cloud and other devices. A three-function model can be utilized to insulate and isolate the management of resources, the software runtime environment, and the interaction of loosely affiliated component functions with each other and their environment. Abstraction and interface agreements can be established between service providers to enable freedom, flexibility, and autonomy. Leveraging open source and third-party innovations can assist with implementation of each layer. Interface agreements can be implemented in a flexible manner, which does not require industry standards for success. This method and approach can benefit vintage and technology applications from legacy/monolith, n-tier, 12-factor, micro-service and nano-functions. The method and approach can apply to deep learning engines, artificial intelligence, and autonomous and stochastic behavior to continuously optimize the execution environment of software-defined functions to point-in-time demand. The method and approach can also harvest valuable insights into the behavioral patterns of humans and software-defined services as they interact across the cloud edge.

A goal of this disclosure is to separate software components that can be deployed, scaled, and failed independently. However, to a consumer, the software components can appear as if they were deployed together. Therefore, a piece of an application can be deployed in several different places and provide the appearance, to a consumer, that it is running in the same place as a tightly coupled set. This can allow software to be deployed on a network that is not owned by the owner of the intelligence that facilitates the deployment. Consequently, there can be a disaggregation of the software.

A software-defined edge can distribute different functionality without having to control the infrastructure of a service provider (e.g., AT&T, Google, Amazon, etc.). The logic and/or functions written into a software application can be configured into independent functions and distributed out to several networks independent of what the functions do. The functions can work with various pieces of physical infrastructure. For example, if there is a virtual routing function, then the virtual routing function can listen at line speed on a network to take every packet off the network, which can be a cost and resource-intensive function. Whereas other functions, may not need such a high-class infrastructure (i.e., a basic computer processing unit, bare metal, etc.). Thus, a proposed behavioral intelligence function can assess independent functions within the software, decide if the independent function can be distributed, where it can be distributed, what class of infrastructure it can be distributed for, and/or what tolerances should be maintained so that the application still functions properly.

Consequently, another goal of this disclosure is to reduce time, cost, and complexity of deploying software. For example, a software function can perform five actions, but one action can be expensive even if the other four actions are not expensive. Currently, without behavioral intelligence, all five actions would have to be deployed to the same platform. However, with the behavioral intelligence model solution, the one expensive action can be broken out and applied to the expensive resources, and the other four actions can be placed on the inexpensive resources, where it will still appear, to the software and the users, that the actions are still running on the same platform. The functions and/or actions can be a software-defined router, Internet of things, augmented reality, and/or virtual reality, etc.

Additionally, using machine learning, the behavioral intelligence system can predict what can happen based on previously assessed behaviors. The behavioral intelligence system can disaggregate the functions, place those functions at a specific infrastructure, and if the infrastructure runs the functions differently, then the behavioral intelligence can translate (e.g., dynamically adapt the functions to work on one or more different platforms) the function to work with the specific infrastructure. Essentially, the behavioral intelligence system can do the work so that the application and/or the user does not have to do the work. For example, in the near future the majority of software will run as containerized packages of code and resources deployed to everything from embedded devices to cloud servers and virtual devices. In order to be deployed across a software-defined network, the software can be described in a specific format (e.g., an industry standard). However, in order to "unpack" the software bundle once it is distributed to a target resource, to execute, a container engine and runtime can be used. The container engine and the runtime state can be different based on the type of target resource and provider. Consequently, they can transition the code and the resources from a static state to a runtime state.

The container engine can interface between the running software and the underlying infrastructure and system software, thus providing abstraction where possible. The disclosed aspects contained herein can instrument the software bundle and the container engine and runtime to gather insight into how the software elements in the bundle interact with each other, with other software elements in its community, and/or with network and infrastructure components.

The solution can incorporate intelligence at the collection point (container engine, runtime, bundle, etc.) and at the provider head end to provide a secure and reliable collection mechanism. The next component can apply machine learning to the data to determine optimizations, transformations and adaptations that might benefit price, performance, and reliability of where and how software bundles and their components should run. The last component can relocate the software bundle(s) and executes the appropriate transformation, adaptation, and updates necessary to have abstraction to the software, any producer, provider, and/or consumer clients that may be using the software element. Consequently, the aforementioned processes can be implemented without instrumenting the software with special code or tools and can work with vintages, architectures, and/or languages of the software generation.

It should also be understood that in additional embodiments, hybrid models that utilize both the traditional deployment approach and the behavioral intelligence deployment approach can be utilized. For example, some applications can only be deployed as a tightly coupled set. Therefore, the traditional model can work for those applications. However, other applications can be decoupled so that the behavioral intelligence model can work. Yet, other applications can benefit from using both models. Thus, in some cases there can be a flexible front-end with a backend that is tightly coupled. Thus, utilizing a hybrid deployment can provide additional benefits that cannot be realized using either the traditional approach or the behavioral intelligence approach separately.

It should also be noted that a behavioral intelligence (BI) component can facilitate automating one or more features in accordance with the disclosed aspects. A memory and a processor as well as other components can include functionality with regard to the figures. The disclosed aspects in connection with a cloud native edge can employ various BI-based schemes for carrying out various aspects thereof. For example, a process for detecting one or more trigger events, disaggregating functions as a result of the one or more trigger events, and modifying one or more functions, and so forth, can be facilitated with an example automatic classifier system and process. In another example, a process for penalizing one function while preferring another function can be facilitated with the example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that can be automatically performed. In the case of cloud native edge systems, for example, attributes can be a source code and the classes can be functions. Parameters from the various infrastructures can be provide to the BI to maintain those parameters (e.g., time, always want to run around x amount of utilization, always want certain providers to find each other, etc.). The BI can then utilize learned behaviors to maintain the parameters. The BI can also allocate resources based on previous behaviors.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing infrastructure usage of software as it relates to triggering events, observing deployment operations, receiving extrinsic information, and so on). For example, SVMs can be configured via a learning or training phase within a classifier constructor and feature selection module. Thus, the classifier(s) can be used to automatically learn and perform a number of functions, including but not limited to modifying software-based functions, modifying deployment operations, and so forth. The criteria can include, but is not limited to, predefined values, frequency attenuation tables or other parameters, service provider preferences and/or policies, and so on.

In one embodiment, described herein is a method comprising receiving, by a wireless network device comprising a processor, software function data representative of a software function of a software application. In response to the receiving the software function data, the method can comprise translating, by the wireless network device, the software function in accordance with a service provider identity, resulting in a translated software function. Additionally, the method can comprise deploying, by the wireless network device, the translated software function to an infrastructure device associated with the service provider identity, resulting in a deployed translated software function. In response to the deploying, the method can comprise monitoring, by the wireless network device, the deployed translated software function.

According to another embodiment, a system can facilitate receiving software function data representative of a software function of a software application. In response to the receiving the software function data, the system can comprise applying interface data to the software function data to facilitate deploying the software function at an infrastructure device, resulting in an updated software function. The system can also facilitate deploying the updated software function at the infrastructure device, resulting in a deployed updated software function. Furthermore, in response to the deploying, the system can comprise monitoring the deployed updated software function for a deviation from an expected outcome.

According to yet another embodiment, described herein is a machine-readable storage medium that can perform the operations comprising receiving a software function associated with a software application of a wireless network. In response to the receiving the software function, machine-readable storage medium can perform the operations comprising applying a translation to the software function in accordance with a service provider identity of the wireless network, resulting in a translated software function. The machine-readable storage medium operations can also comprise deploying the translated software function to an infrastructure device associated with the service provider identity, resulting in a deployed translated software function. Furthermore, in response to the deploying, the machine-readable storage medium can perform the operations comprising analyzing the deployed translated software function for a deviance from a determined outcome.

These and other embodiments or implementations are described in more detail below with reference to the drawings.

Referring now to FIG. 1, illustrated is an example behavioral intelligence component of a wireless network according to one or more embodiments. In one or more embodiments, the behavioral intelligence component 100 can comprise one or more subcomponents (e.g., interrogator component 102, deployment component 104, analysis component 106, modification component 110, etc.), which can be electrically and/or communicatively coupled to one another in various embodiments. As shown in FIG. 1, the subcomponents can be communicatively coupled to the memory 108 and the processor 112. The behavioral intelligence component 100 can determine how software applications can transition from one configuration to another configuration (e.g., from a first state to a second state) to achieve a particular goal. For example, the behavioral intelligence component 100 can be configured to describe software to a cloud native layer based on predetermined standards. Consequently, the interrogator component 102 can read source code to determine how a software application should be deployed and/or described to a specific infrastructure. The behavioral intelligence component 100 can translate the software and/or software functions according to a specific language of an infrastructure that has been analyzed. Thereafter, during runtime management, now that the behavioral intelligence component 100 has determined how the software application should be deployed and/or described (e.g., language translated), the behavioral intelligence component 100 can provide the software applications and/or software functions of the software applications with a specific reference identification (e.g., frequency). The deployment component 104 can be configured to deploy the software and/or software functions after the interrogator component 106 has described the software and/or software functions. The reference identification can then be used by the analysis component 106 to identify the software and/or software functions and to determine how the software and/or software functions are performing, or have performed, after they have been deployed within the infrastructure(s). For example, if the software and/or software function has received a run-time error during or after deployment, then the run-time error data can be communicated back to the behavioral intelligence component 100 for further analysis. Thus, the behavioral intelligence component 100 can be configured to identify the deployed software and/or software functions and assess how they are performing for different infrastructures at different levels. Based on the analysis by the analysis component 106, additional modifications (e.g., translations and/or description data can be applied to the software and/or software functions) can be performed on the software and/or software functions, for future deployments to various infrastructures, by the modification component 110. For example, if a deviance to the software and/or software functions has occurred at the infrastructure, the deployed software and/or software function (or future iterations of the software and/or software functions) can be modified by the modification component 110 to mitigate the deviance. Additionally, the software and/or software functions can be aggregated, by the modification component 110, so that multiple software and/or software functions are deployed together to mitigate the deviance. Thus, the behavioral intelligence component 100 can aggregate the current states of software and/or software functions at multiple levels of the infrastructures.

It should also be noted that the BI component 100 can facilitate automating one or more features in accordance with the disclosed aspects. The memory 108 and the processor 112 as well as other components can include functionality with regard to the figures. The disclosed aspects in connection with applying behavioral intelligence at the cloud edge can employ various BI-based schemes that facilitate carrying out various aspects thereof. For example, a process for detecting one or more trigger events, determining a translation as a result of the one or more trigger events, and deploying the translated software and/or software functions, and so forth, can be facilitated with an example automatic classifier system and process. In another example, a process for penalizing a translation while preferring another translation from the infrastructures can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via generic training data) as well as implicitly trained (e.g., via observing the behavioral intelligence component 100 as it relates to the triggering events). For example, SVMs can be configured via a learning or training phase within a classifier constructor and feature selection module. Thus, the classifier(s) can be used to automatically learn and perform a number of functions, including but not limited to generating a plan, calculating one or more contributions, and so forth. The criteria can include, but is not limited to, predefined values, contribution attenuation tables or other parameters, preferences and/or policies, and so on.

Figure 2:
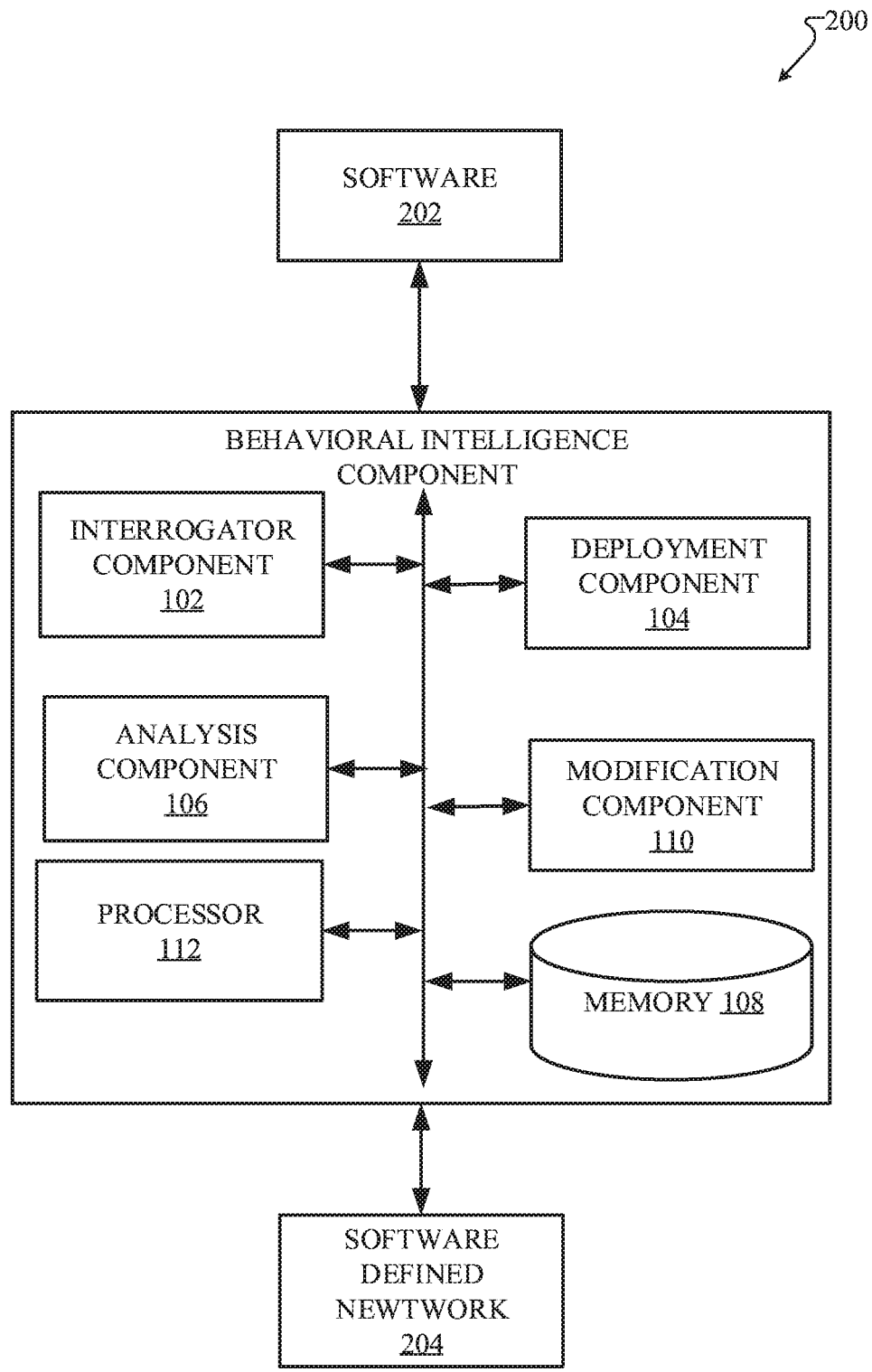
FIG. 2 illustrates an example cloud edge network comprising a behavioral intelligence component according to one or more embodiments.

Referring now to FIG. 2, illustrated is an example cloud edge network comprising a behavioral intelligence component according to one or more embodiments. Repetitive description of like elements employed in other embodiments described herein is omitted for sake of brevity.

As depicted in FIG. 2, software 202 and/or software functions can be received by the behavioral intelligence component 100. The interrogator component 102 can read source code associated with the software 202 to determine how a software application should be deployed and/or described to the software-defined network 204. Thus, the behavioral intelligence component 100 can translate the software 202 and/or software functions according to specific languages associated with various infrastructures that have previously been analyzed. Thereafter, during runtime management, now that the behavioral intelligence component 100 has determined how the software 202 should be deployed and/or described (e.g., language translated) to the software-defined network 204, the behavioral intelligence component 100 can provide the software applications and/or software functions of the software with a specific reference identification (e.g., frequency, tag, identification data, etc.). The deployment component 104 can be configured to deploy the software and/or software functions after the interrogator component 102 has described the software and/or software functions. The reference identification can then be used by the analysis component 106 to identify the software 202 and/or software functions and to determine how the software 202 and/or software functions are performing after they have been deployed within the infrastructure(s). Thus, the behavioral intelligence component 100 can be configured to receive performance data related to the deployed software from the software-defined network 204, identify the deployed software and/or software functions based on the reference identification, and assess how the software is performing for different infrastructures at different levels. Based on the analysis by the analysis component 106, additional description and/or translation data can be applied to the software and/or software functions, for future deployments to various infrastructures, by the modification component 110. For example, based on the performance data received from the software-defined network by the behavioral intelligence component 100, if the analysis component 106 determined that a specific software function did not perform properly for a specific infrastructure, then the modification component 110 can remove or modify the software function so that it 1) does not deploy for the same infrastructure again, or 2) is modified to interact properly with the infrastructure. Thus, the behavioral intelligence component 100 can aggregate the current states of software and/or software functions at multiple levels of the infrastructures and use that data for future modifications and/or deployments.

Figure 3:
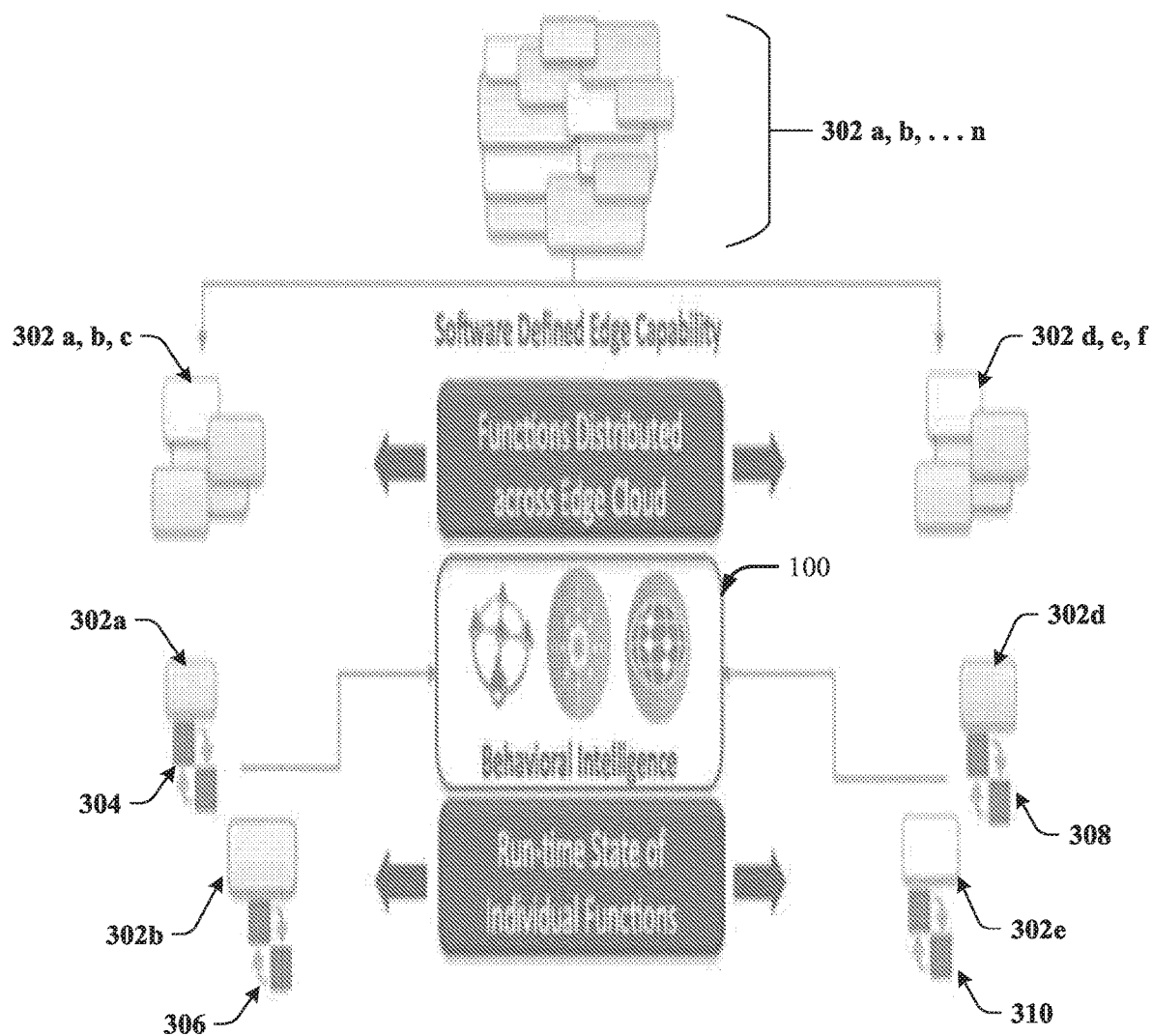
FIG. 3 illustrates an example cloud edge network comprising software functions interaction according to one or more embodiments.

Referring now to FIG. 3, illustrated is an example cloud edge network comprising software function interaction according to one or more embodiments. Repetitive description of like elements employed in other embodiments described herein is omitted for sake of brevity.

The cloud native edge can distribute different functionality without having to control the infrastructure. Thus, the logic and/or functions 302a, b, . . . n written into a software application can be independently distributed out to several networks independent of what the functions do. The functions 302a, b, . . . n can work with different physical infrastructure devices 304, 306, 308, 310. For example, if there is a virtual routing function, then the virtual routing function can listen at line speed on a network to take every packet off the network, which can be a cost and resource intensive function. Whereas other functions, may not need such a high-class infrastructure (i.e., a basic CPU, bare metal, etc.). Thus, the behavioral intelligence component 100 can assess independent functions 302a, b, . . . n within the software 202, decide if the functions 302a, b, . . . n can be distributed, where the functions 302a, b, . . . n can be distributed, what class of infrastructure the functions 302a, b, . . . n can be distributed for, and/or what tolerances should be maintained so that the software application still functions properly when interfacing with the infrastructures 304, 306, 308, 310. Consequently, time, cost, and complexity of deploying the software 202 can be reduced.

Thus, using machine learning, the behavioral intelligence component 100 can predict what can happen based on previously assessed behaviors. The behavioral intelligence component can take the functions 302a, b, . . . n and disaggregate them, place those functions 302a, b, . . . n at a specific infrastructure 304, 306, 308, 310, and if the infrastructures 304, 306, 308, 310 run the functions 302a, b, . . . n differently, then the behavioral intelligence component 100 can translate (e.g., dynamically adapt the functions to work on the several different infrastructures) the functions 302a, b, . . . n to work with the specific infrastructures 304, 306, 308, 310.

Figure 4:
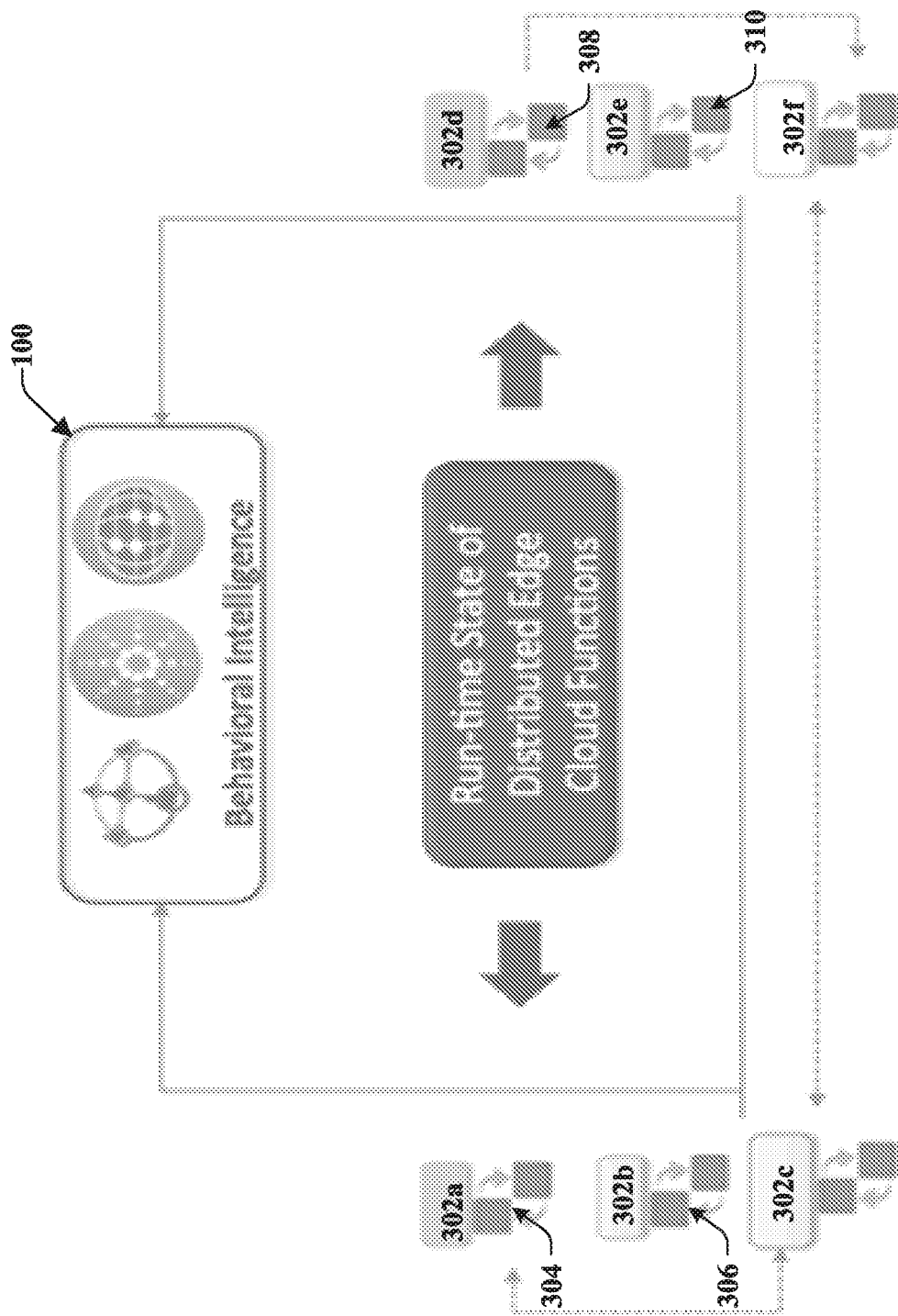
FIG. 4 illustrates an example cloud edge network applying behavioral intelligence to software functions according to one or more embodiments.

Referring now to FIG. 4, illustrated is an example cloud edge network applying behavioral intelligence to software functions according to one or more embodiments. Repetitive description of like elements employed in other embodiments described herein is omitted for sake of brevity.

Inter-process calling is the language that different software functions 302 a, b, . . . n use to communicate with each other. System calls, I/O calls, network calls, and storage interactions is how the software application talks to an underlying platform (e.g., the software can communicate that it can take data and write it to a disk, or it can put the data out on the network and send it to another party, or it store it can store the data in memory to do a computation). Thus, the analysis component 106 can understand how the software functions 302a, b, . . . n are interacting with each other and interacting with their infrastructures 304, 306, 308, 310. For example, the behavioral intelligence component 100 can analyze the software function 302a communicating with the software function 302c as depicted in FIG. 4. Alternatively, the behavioral intelligence component 100 can analyze the software function 302a communicating with the infrastructure 304. Therefore, knowing where the software functions 302a, b, . . . n are, how the software functions 302a, b, . . . n are communicating with each other, and/how the software functions 302a, b, . . . n are interacting with the infrastructure 304, 306, 308, 310, which it has been distributed to, can allow control and visibility at the software edge.

The behavioral intelligence component 100 can understand the runtime state of the cloud functions that it puts out on the edge. Once the behavioral intelligence component 100 understands the runtime state of the functions, it can scale or fail individual application functions based on the utilization of one application function in relation to other application functions. Thus, the behavioral intelligence component can understand the demand for the functions 302a, b, . . . n, how the functions 302a, b, . . . n are performing, if the functions are 302a, b, . . . n being over-utilized, and/or where the demand for the functions 302a, b, . . . n are coming from. Based on this data, application functions 302a, b, . . . n can be moved closer to where the demand is coming from for resource optimization throughout the lifetime cycle of the functions 302a, b, . . . n.

Figure 5:
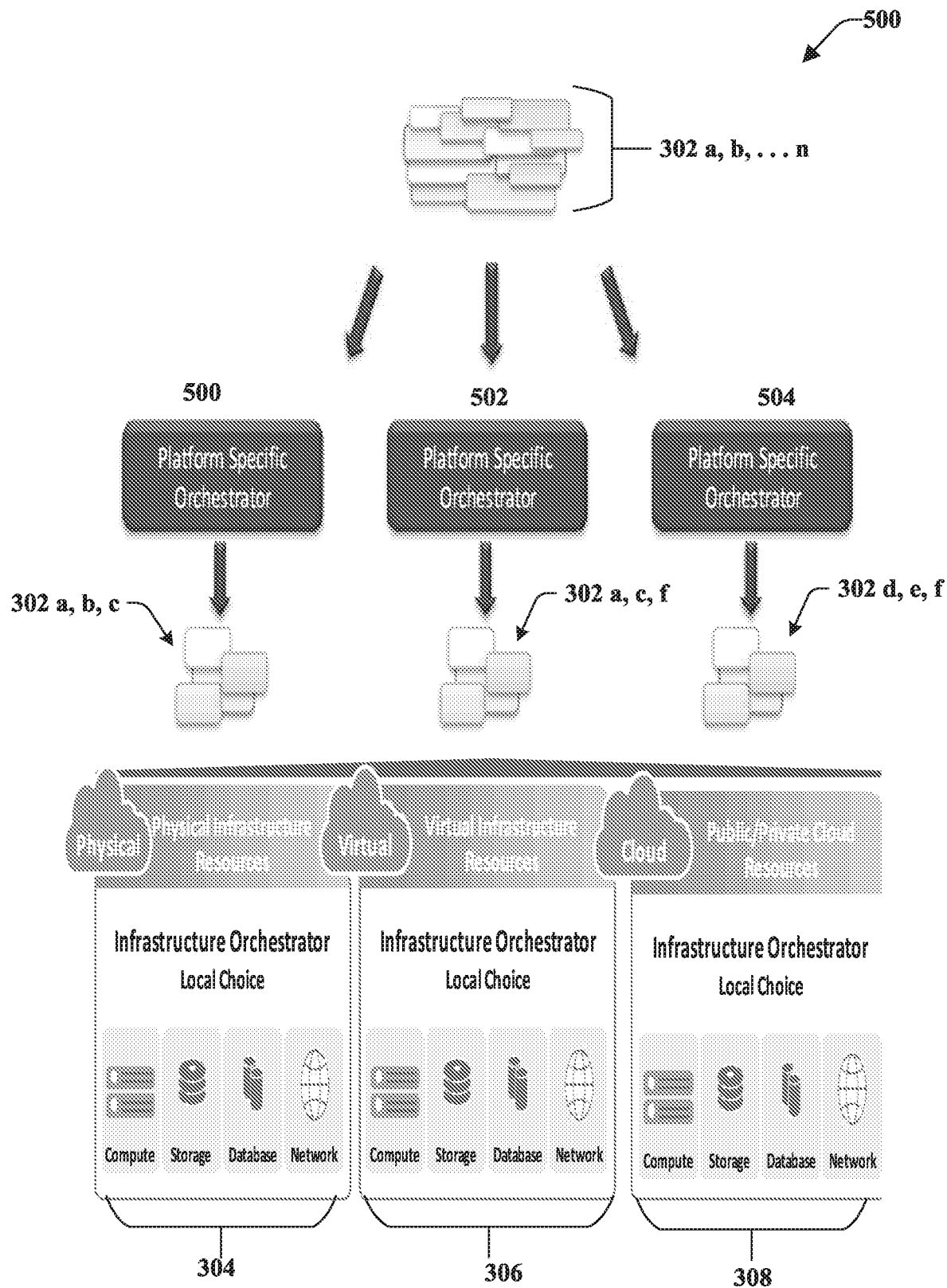
FIG. 5 illustrates an example cloud edge network comprising a traditional deployment process according to one or more embodiments.
Figure 6:
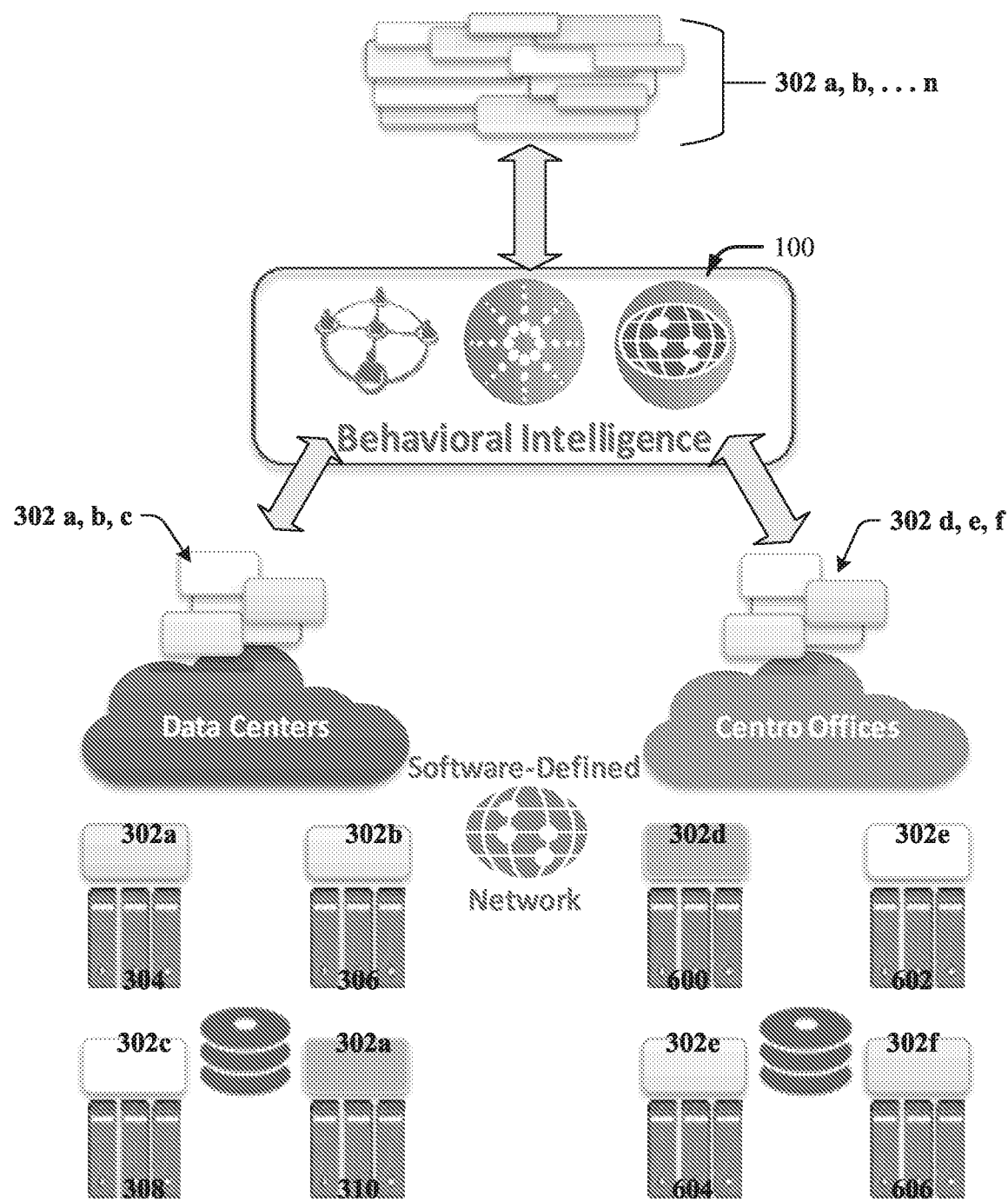
FIG. 6 illustrates an example cloud edge network comprising a behavioral intelligence-based deployment process according to one or more embodiments.

Referring now to FIG. 5 and FIG. 6, illustrated is an example cloud edge network comprising a traditional deployment process and a behavioral intelligence deployment process, respectively, according to one or more embodiments. Repetitive description of like elements employed in other embodiments described herein is omitted for sake of brevity.

FIG. 5 depicts a traditional approach to software 200 and software application functions 302a, b, . . . n being deployed to different types of infrastructures (e.g., 304, 306, 308). The various infrastructures 304, 306, 308 can have their own platform specific orchestrators 500, 502, 504 speaking its own language. Therefore, for the software 200 and/or software application functions 302a, b, . . . n to be deployed, the platform specific orchestrators 500, 502, 504 have to speak the language of the software 200 and/or software application functions 302a, b, . . . n. Under the different platform specific orchestrators 500, 502, 504, the platform infrastructures can add another layer of complexity due to platform specific orchestrators 500, 502, 504 having a different layer of intelligence. Alternatively, as opposed to FIG. 5, FIG. 6 depicts the various infrastructures 304, 306, 308, 310, 600, 602, 604, 606 receiving the software 200 and/or software application functions 302a, b, . . . n, which have already been translated by the behavioral intelligence component 100, to communicate and/or interface with the various infrastructures 304, 306, 308, 310, 600, 602, 604, 606.

Figure 7:
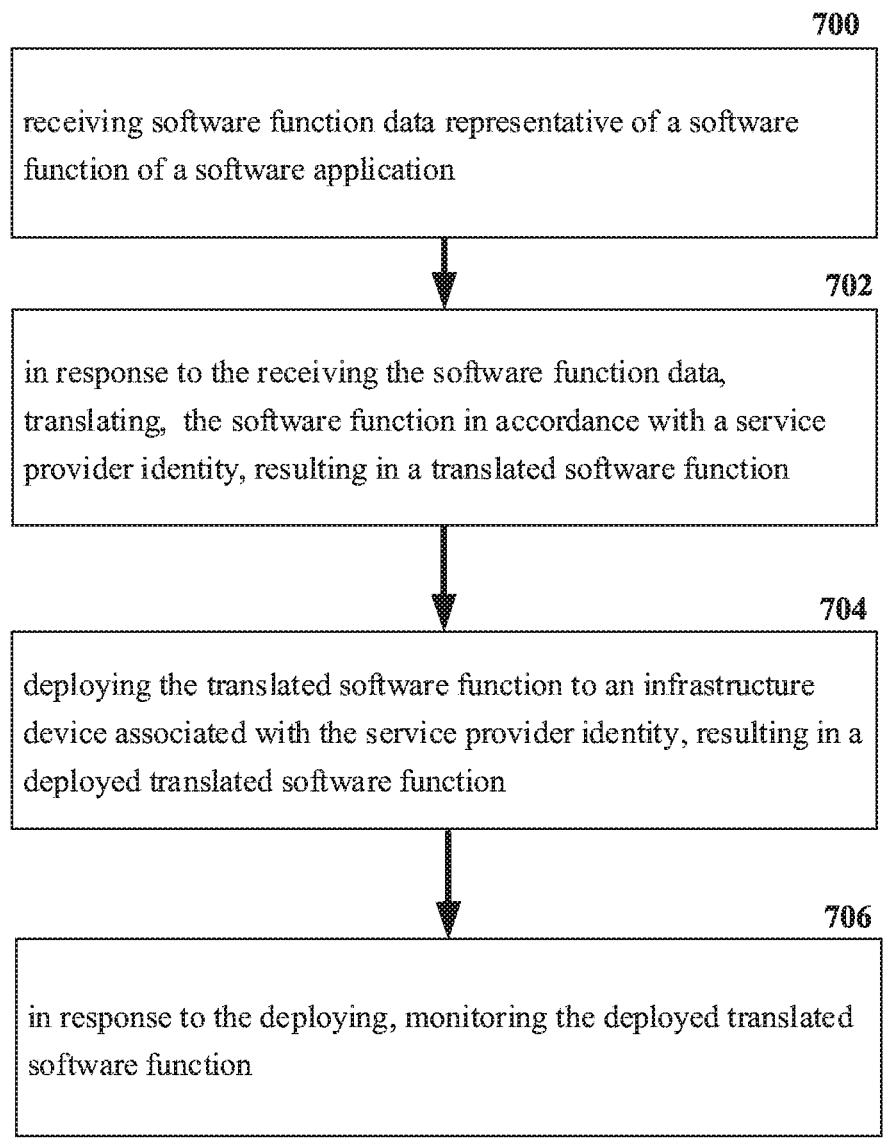
FIG. 7 illustrates an example flow diagram for a method associated with utilizing behavioral intelligence according to one or more embodiments.

Referring now to FIG. 7, illustrated is an example flow diagram for a method associated with utilizing behavioral intelligence according to one or more embodiments. At element 700, the method can comprise receiving (e.g., from the software 202) software function data representative of a software function of a software application. In response to the receiving the software function data, the method can comprise translating (e.g., via the interrogator component 102) the software function in accordance with a service provider identity, resulting in a translated software function at element 702. Additionally, the method can comprise deploying (e.g., via the deployment component 104) the translated software function to an infrastructure device associated with the service provider identity, resulting in a deployed translated software function at element 704. At element 706, in response to the deploying, the method can comprise monitoring (e.g., via the analysis component 106) the deployed translated software function.

Figure 8:
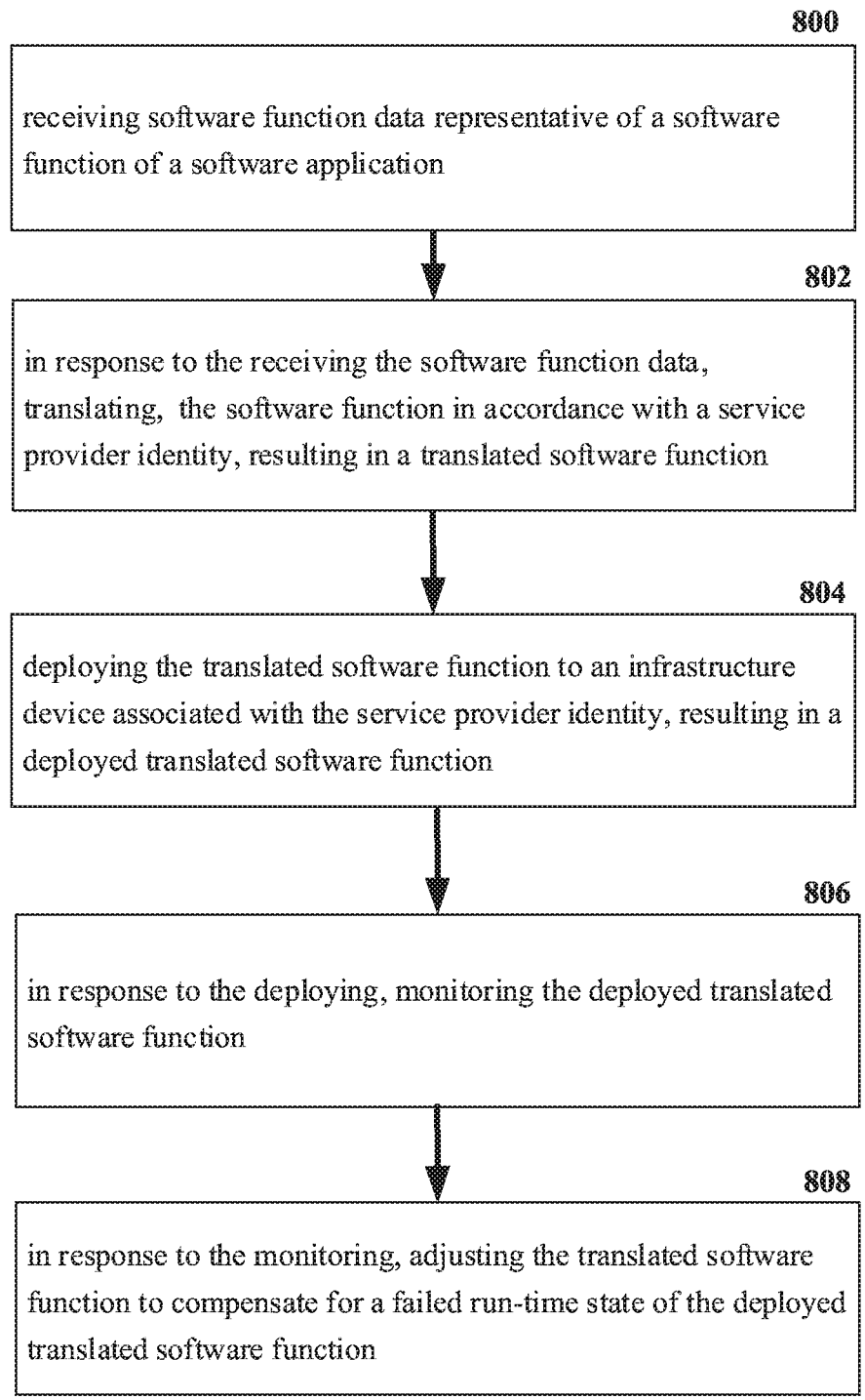
FIG. 8 illustrates an example flow diagram for another method associated with utilizing behavioral intelligence according to one or more embodiments.

Referring now to FIG. 8, illustrated is an example flow diagram for another method associated with utilizing behavioral intelligence according to one or more embodiments. At element 800, the method can comprise receiving (e.g., from the software 202) software function data representative of a software function of a software application. In response to the receiving the software function data, the method can comprise translating (e.g., via the interrogator component 102) the software function in accordance with a service provider identity, resulting in a translated software function at element 802. Additionally, the method can comprise deploying (e.g., via the deployment component 104) the translated software function to an infrastructure device associated with the service provider identity, resulting in a deployed translated software function at element 804. At element 806, in response to the deploying, the method can comprise monitoring (e.g., via the analysis component 106) the deployed translated software function. Furthermore, at element 808, in response to the monitoring, the method can comprise adjusting (e.g., via the modification component 110) the translated software function to compensate for a failed run-time state of the deployed translated software function.

Figure 9:
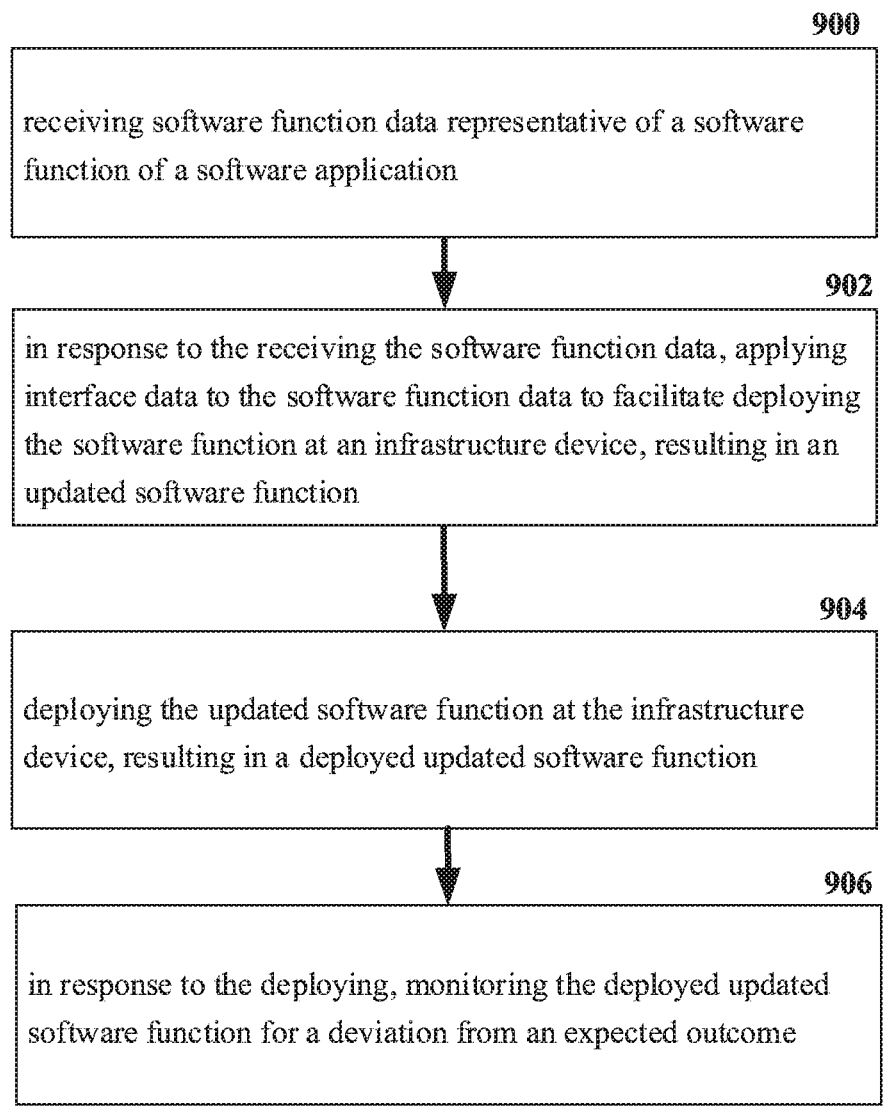
FIG. 9 illustrates an example flow diagram for a system associated with utilizing behavioral intelligence according to one or more embodiments.

Referring now to FIG. 9, illustrated is an example flow diagram for a system associated with utilizing behavioral intelligence according to one or more embodiments. At element 900, the system can comprise receiving software function data (e.g., from the software 202) representative of a software function of a software application. In response to the receiving the software function data, the system can apply interface data (e.g., via the interrogator component 102) to the software function data to facilitate deploying the software function at an infrastructure device, resulting in an updated software function at element 902. Additionally, the system can deploy (e.g., via the deployment component 104) the updated software function at the infrastructure device, resulting in a deployed updated software function at element 904. In response to the deploying, the system can monitor (e.g., via the analysis component 106) the deployed updated software function for a deviation from an expected outcome at element 906.

Figure 10:
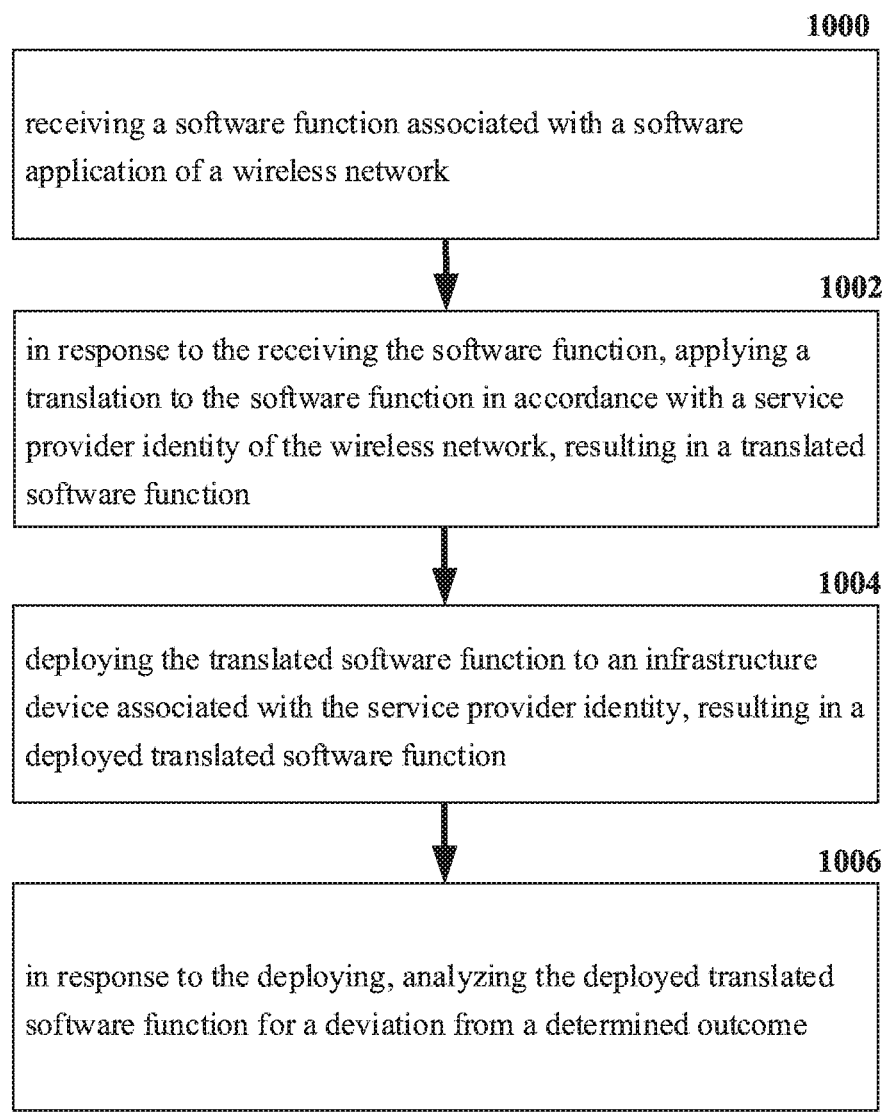
FIG. 10 illustrates an example flow diagram for a machine-readable medium associated with utilizing behavioral intelligence according to one or more embodiments.

Referring now to FIG. 10, illustrated is an example flow diagram for a machine-readable medium associated with utilizing behavioral intelligence according to one or more embodiments. At element 1000, the machine-readable medium operations can comprise receiving a software function (e.g., from the software 202) associated with a software application of a wireless network. At element 1002, in response to the receiving the software function, the machine-readable medium operations can comprise applying a translation (e.g., via the interrogator component 102) to the software function in accordance with a service provider identity of the wireless network, resulting in a translated software function. The machine-readable medium operations can comprise deploying (e.g., via the deployment component 104) the translated software function to an infrastructure device associated with the service provider identity, resulting in a deployed translated software function at element 1004. In response to the deploying, the machine-readable medium operations can comprise analyzing (e.g., via the analysis component 106) the deployed translated software function for a deviance from a determined outcome at element 1006

Figure 11:
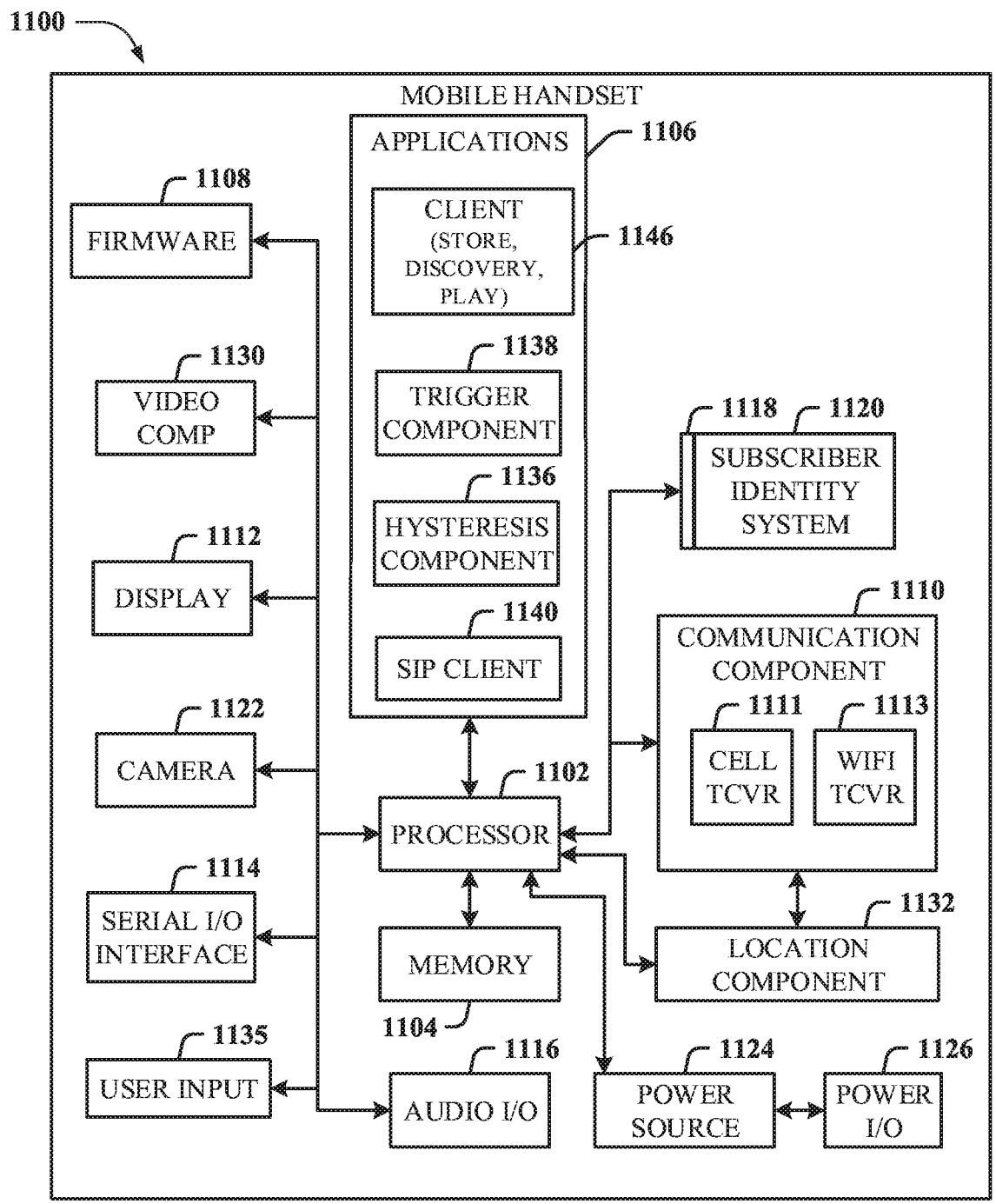
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
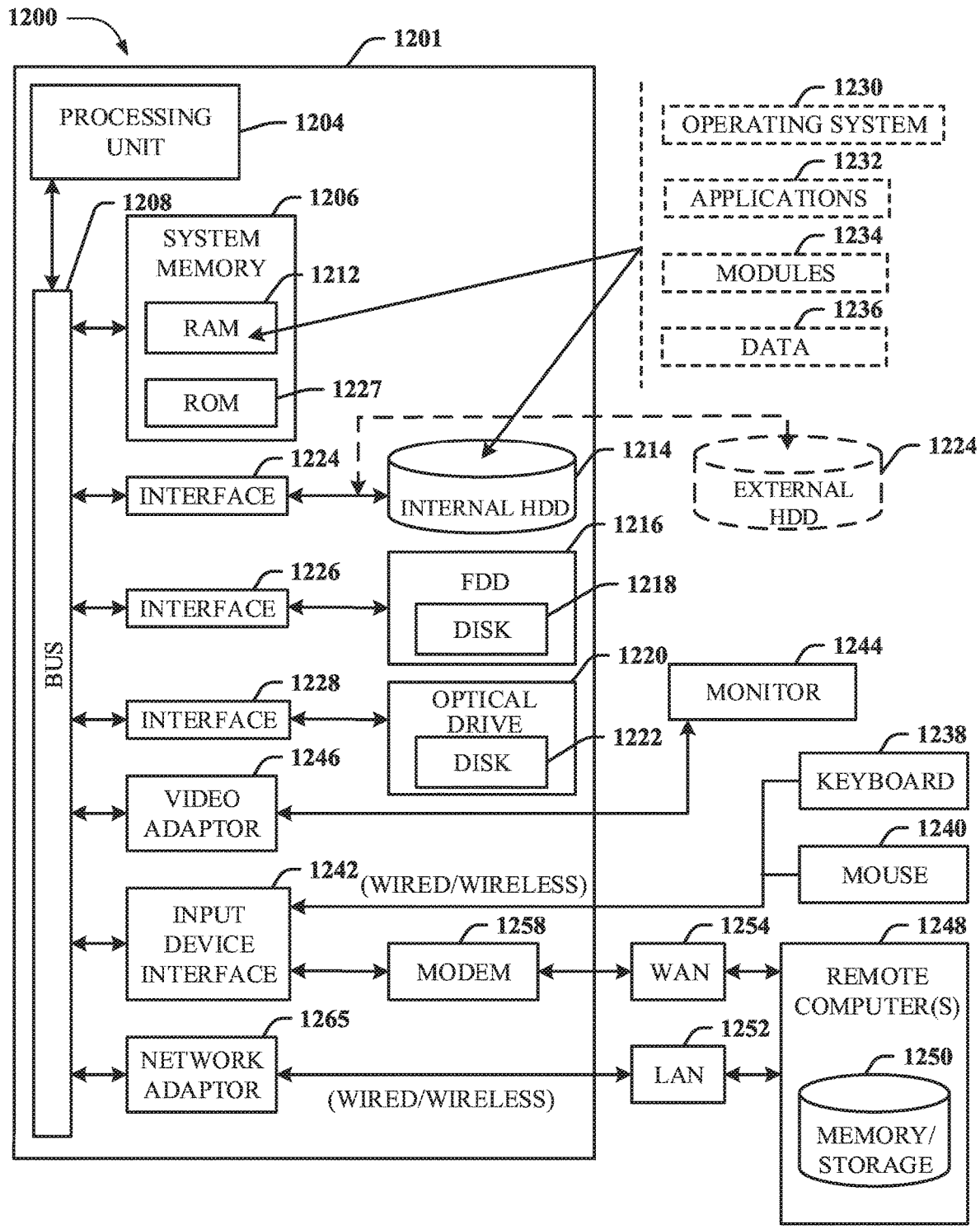
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a network equipment comprising a processor, software function data representative of a software function of a software application;
    in response to the receiving of the software function data, translating, by the network equipment, the software function in accordance with a service provider identity, resulting in a translated software function;
    deploying, by the network equipment, the translated software function to a first infrastructure device associated with the service provider identity, resulting in a first deployed translated software function;
    in response to the deploying, monitoring, by the network equipment, the first deployed translated software function;
    generating, by the network equipment, prediction data representative of a prediction associated with the first deployed translated software function, the prediction being based on the monitoring the first deployed translated software function;
    based on the prediction, disaggregating, by the network equipment, the first deployed translated software function, resulting in a first translated software function and a second translated software function;
    in response to disaggregating the first deployed translated software function:
        deploying, by the network equipment, the first translated software function to the first infrastructure device, resulting in a second deployed translated software function, and
        deploying the second translated software function to a second infrastructure device, different than the first infrastructure device, resulting in a third deployed translated software function;
    in response to deploying the second translated software function and the third translated software function:
        determining, by the network equipment, a first difference between the first deployed translated software function and the second deployed translated software function at the first infrastructure device, and
        determining, by the network equipment, a second difference between the first deployed translated software function and the third deployed translated software function at the second infrastructure device; and
    based on the first difference and the second difference, adapting, by the network equipment, the second deployed translated software function to operate on the first infrastructure device and the third deployed translated software function to operate on the second infrastructure device.

2. The method of claim 1, wherein determining the first difference comprises comparing a first run parameter of the first deployed translated software function to a second run parameter of the second deployed translated software function.

3. The method of claim 2, further comprising:
    in response to the monitoring, adjusting, by the network equipment, the translated software function to compensate for a failed run-time state of the first deployed translated software function.

4. The method of claim 1, wherein deploying the translated software function to the first infrastructure device comprises deploying the first translated software function via a software defined network device.

5. The method of claim 1, further comprising:
    in response to the monitoring, aggregating, by the network equipment, the first translated software function and the second translated software function to accommodate the service provider identity.

6. The method of claim 1, wherein the translating comprises analyzing a previous deployment of the first translated software function to generate additional translation data.

7. The method of claim 1, further comprising:
    receiving, by the network equipment, translation data associated with a translation to be used for the deploying of the first translated software function.

8. A system, comprising:
    a processor; and
    a memory that stores executable instructions that, when executed by the processor, facilitate performance of operations, comprising:
        receiving software function data representative of a software function of a software application;
        in response to the receiving the software function data, applying interface data to the software function data to facilitate deploying the software function at a first infrastructure device, resulting in an updated software function;

deploying the updated software function at the first infrastructure device, resulting in a first deployed updated software function;

in response to the deploying, monitoring the first deployed updated software function for a deviation from an expected outcome;

in response to the monitoring of the first deployed updated software function, generating prediction data representative of a prediction associated with the first deployed updated software function; and based on the prediction, disaggregating the interface data, resulting in a first disaggregated software function and a second disaggregated software function comprising the interface data;

in response to disaggregating the interface data:
deploying the first disaggregated software function to the first infrastructure device, resulting in a second deployed updated software function, and
deploying the second disaggregated software function to a second infrastructure device, different than the first infrastructure device, resulting in a third deployed updated software function;

in response to deploying the second deployed updated software function and the third deployed updated software function:
determining a first difference between the first deployed updated software function and the second deployed updated software function at the first infrastructure device, and
determining a second difference between the first deployed updated software function and the third deployed updated software function at the second infrastructure device; and in response to determining the first difference and the second difference, adapting the second deployed updated software function to operate on the first infrastructure device and the third deployed updated software function to operate on the second infrastructure device.

9. The system of claim 8, wherein the operations further comprise:
based on the monitoring of the first deployed updated software function, receiving an indication of the deviation from the expected outcome.

10. The system of claim 9, wherein the indication comprises runtime error data representative of a runtime error of the first deployed updated software function.

11. The system of claim 9, wherein the operations further comprise:
in response to the receiving of the indication of the deviation from the expected outcome, modifying the updated software function to mitigate the deviation, resulting in a modified software function.

12. The system of claim 11, wherein the operations further comprise:
in response to the modifying of the updated software function, deploying the modified software function at the first infrastructure device.

13. The system of claim 8, wherein the first deployed updated software function is an augmented reality function.

14. The system of claim 8, wherein the first deployed updated software function is a virtual reality function.

15. A non-transitory machine-readable medium, comprising executable instructions that, when executed by a processor, facilitate performance of operations, comprising:
receiving a software function associated with a software application of enabled via a network;

in response to the receiving of the software function, applying a translation to the software function in accordance with a service provider identity associated with the network, resulting in a translated software function;

deploying the translated software function to a first infrastructure device associated with the service provider identity, resulting in a first deployed translated software function;

in response to the deploying, analyzing the first deployed translated software function for a deviation from a determined outcome;

based on the deviation being determined to have occurred, generating prediction data representative of a prediction associated with the first deployed translated software function;

based on the prediction data, disaggregating the first deployed translated software function, resulting in a first translated software function and a second translated software function;

in response to disaggregating the first deployed translated software function:
deploying the first translated software function to the first infrastructure device, resulting in a second deployed translated software function, and
deploying the second translated software function to a second infrastructure device, different than the first infrastructure device, resulting in a third deployed translated software function;

in response to deploying the second translated software function and the third translated software function:
determining a first difference between the first deployed translated software function and the second deployed translated software function at the first infrastructure device, and
determining a second difference between the first deployed translated software function and the third deployed translated software function at the second infrastructure device; and in response to determining the first difference and the second difference, modifying the second deployed translated software function to operate on the first infrastructure device and the third deployed translated software function to operate on the second infrastructure device.

16. The non-transitory machine-readable medium of claim 15, wherein the operations further comprise:
based on the analyzing of the first deployed translated software function, determining that the deviation has occurred.

17. The non-transitory machine-readable medium of claim 16, wherein the operations further comprise:
in response to the determining that the deviation has occurred, modifying the first deployed translated software function to reduce the deviation.

18. The non-transitory machine-readable medium of claim 16, the operations further comprise:
in response to the determining that the deviation has occurred, aggregating the second deployed translated software function with the first deployed translated software function to mitigate the deviation, resulting in an aggregated software function.

19. The non-transitory machine-readable medium of claim 18, wherein the operations further comprise:
 deploying the aggregated software function to compensate for the deviation.

20. The non-transitory machine-readable medium of claim 19, wherein the aggregated software function is an augmented reality software function.

* * * * *